Figure 1:
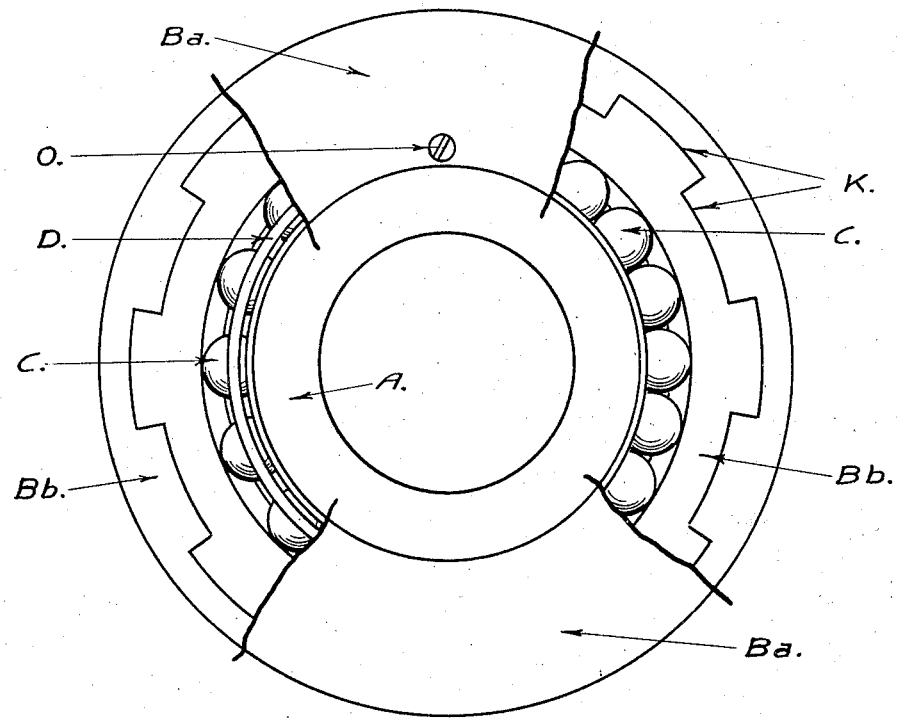

Jan. 25, 1927.

E. G. DU MAZUEL 1,615,810

BREECH LOCK BEARING

Filed April 10, 1922     3 Sheets-Sheet 1

Inventor:

Jan. 25, 1927.  
E. G. DU MAZUEL  
1,615,810

BREECH LOCK BEARING

Filed April 10, 1922    3 Sheets-Sheet 3

Inventor:

Patented Jan. 25, 1927.

1,615,810

UNITED STATES PATENT OFFICE.

EDMOND G. DU MAZUEL, OF NEW YORK, N. Y., ASSIGNOR TO KAS-SO KITCH-E-MON-E-TOO SO-NE-AH LIMITED, A CORPORATION OF CANADA.

BREECH-LOCK BEARING.

Application filed April 10, 1922. Serial No. 551,405.

My invention relates to improvements in bearings; and more particularly to bearings adapted for great radial and thrust loads, and very high velocities.

My bearings being breech-locked form self-contained units, easy to adapt to any ball, easy to install and easy to assemble and take apart for inspection.

My bearings have very few parts; and, these parts are such that they can be given any outer shape, and include if need be a compensator so that it can automatically adjust itself to compensate for any deflection of an old damaged shaft without jamming or overloading any of the balls. Each part of my bearings is such as to give uniform strength throughout.

My bearings being breech-locked carry the highest possible number of balls of a diameter that can be made equal, at least, to a quarter of the diameter of the shaft. Thus the carrying capacity is high, or in other words the load per ball is at a minimum.

My bearings being breech-locked allow the shape of the tracks to be such as to fit the balls snugly and yet allow for their absolutely free rolling.

My bearings being breech-locked are thus able to take thrust as well as radial loads.

Other features of my bearings will be in part obvious and in part hereinafter pointed out.

The parts of my bearings can be made of any alloy; and, by the term alloy I mean: carbon steel; chromium steel; vanadium steel; or any other steel or metal or alloy, rolled, forged, heat-treated, pressed, or otherwise worked; or any other material suited for the purpose.

My bearings can be designed for any kind of ball, the term ball meaning a solid or hollow alloy body of spherical, cylindrical or other shape.

In my bearings the grooves that are shaped to fit the balls and on and in which the said balls run are termed track or tracks. These tracks take and transmit the radial as well as the thrust loads.

In my bearings the inner alloy ring or rings that stand against the shaft and on the tracks of which the balls run or race is or are termed race.

In my bearings the outer alloy ring, whether of one piece or of several pieces, whether in the form of a true cylinder or of any other outer shape or form, that is provided with tracks and that hold the balls and the race together, absorbing the radial and thrust loads, is termed collar.

The collars of my bearings are formed of two or more circular parts having their various adjacent and contiguous parallel faces shaped into alternating male and female forms so that said circular parts will dovetail one another, become positively locked, prevented to come apart, and thus form a collar "breech-locked" as of one mass and of any desired outer shape.

In my bearings the space between the race and collar is termed tunnel.

In my bearings any alloy spacer or spacers that may be placed in the tunnel to separate the balls, if so desired, is termed a cage.

My bearings may be provided with compensators, and by that term is meant the radial outer housing or sleeve or casing of which the inner surface, as well as the outer radial surface of the collar, are so spherically or otherwise curved as to automatically take up or compensate a damaged or deflected shaft. For new or old shafts that are properly designed to carry their loads such compensators are not necessary. Compensators may have any outer form or shape as desired.

Figure 2:
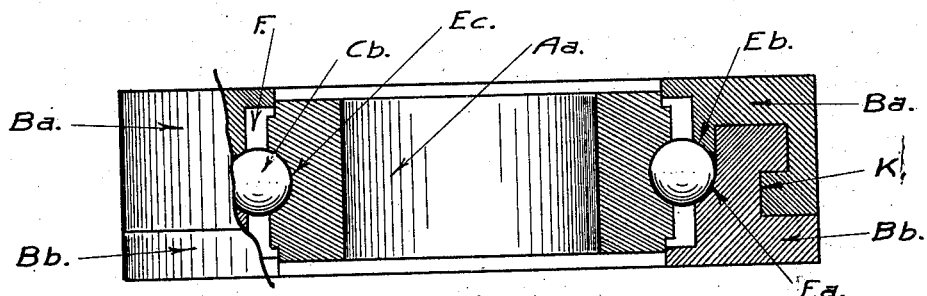
Figure 3:
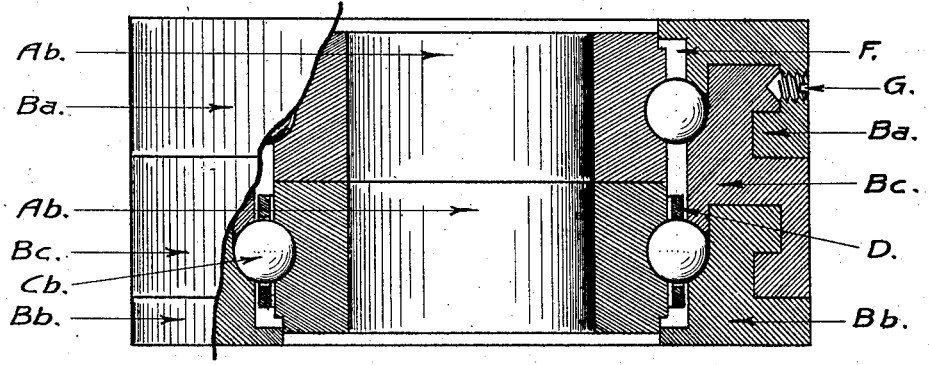
Figure 4:
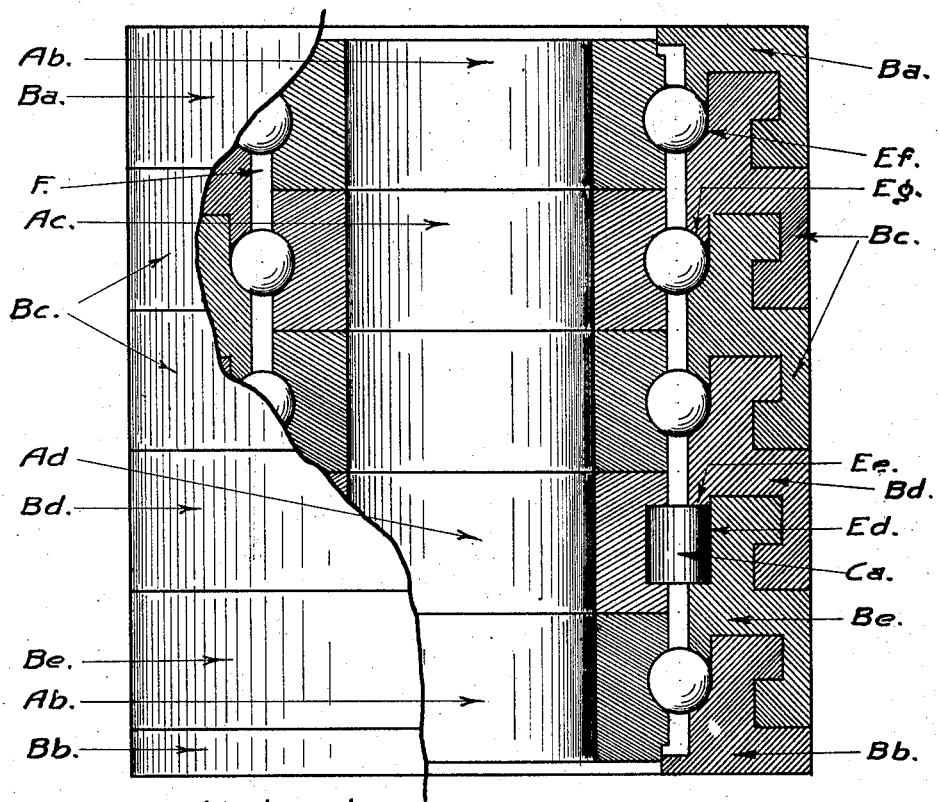
Figure 5:
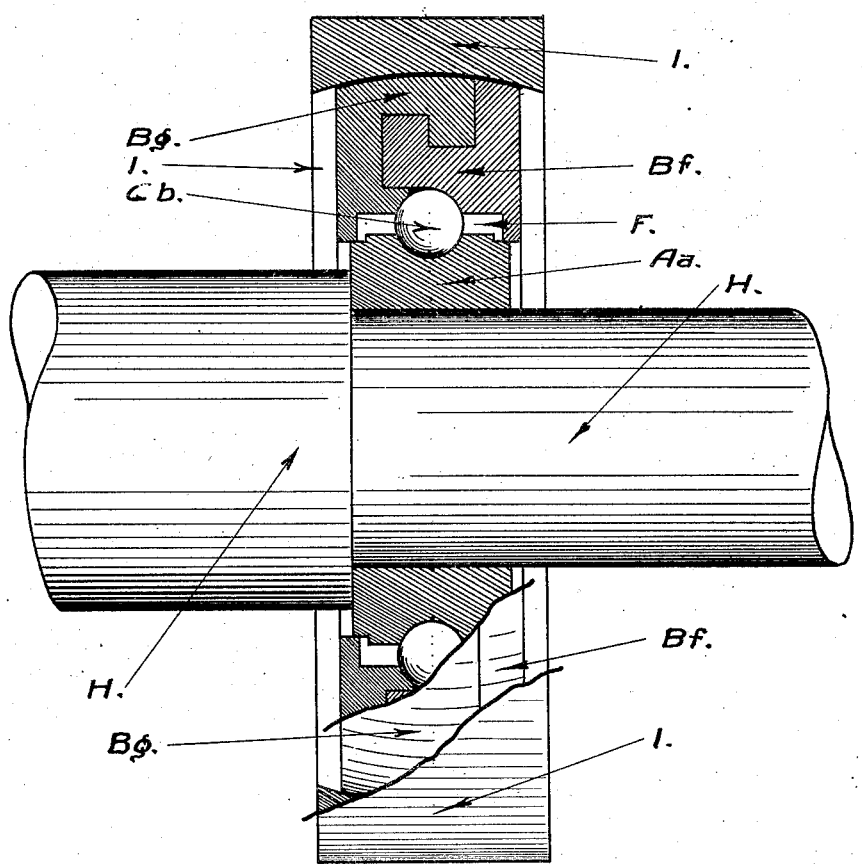
Figure 6:

Referring to the drawings, Figure 1 is a front view of my bearing so cut as to show on one side the balls in their tracks without cage, and on the other side the balls in their tracks and cage. Figures 2, 3 and 4 are side views of my bearing, so cut as to show some of the innumerable possible inside arrangements. Figure 5 is a view of my bearing, so cut as to show a possible application. Figure 6 is a view of four out of hundreds of different shaped balls. In these figures parts are designated by capital letters, and differently shaped same parts by same capitals with a small letter added.

My bearing consists of a race "A" that goes around a shaft "H," of balls "C"; and of a collar "B"; to which may be added cages "D" and compensators "I".

The collar "B" totally encloses the tunnel "F", the balls "C", and cages "D", and partially encloses the race "A".

The race "A" may be of one or more pieces.

The collar "B" is formed of two or more pieces or circular parts having their various adjacent and contiguous parallel faces shaped into alternating male and female forms "K" so that said circular parts will dovetail one another ("B$^a$", "B$^b$", "B$^c$", "B$^d$", "B$^e$", "B$^f$").

The tunnel oiling can be done through any oil hole "O", Figure 1.

Positive locking of the collar can be had by locking screws "G" (Fig. 3).

The collar "B" and the race "A" may be so subdivided for any number of rows of balls, or for any stepped-down shaft, as desired.

It is obvious that the moment the balls "C" are locked in place by collar "B" that the race "A" is also automatically locked in place, the whole thus forming a bearing "breech-locked".

Although I have shown one style or design of a simple breech-locked bearing in the drawings and specifications, yet I wish it clearly understood that I do not restrict myself to any one style or design.

Claims—

1. A bearing consisting of a race and tracks; of a large number of balls; and of two circular parts forming a collar, said circular parts having their various adjacent and contiguous parallel faces shaped into alternating male and female forms so that said circular parts will dovetail one another forming one mass.

2. A bearing consisting of a number of parts forming a race; of tracks; of a large number of balls; and of several circular parts forming a collar, said circular parts having their various adjacent and contiguous parallel faces shaped into alternating male and female forms so that said circular parts will dovetail one another forming one mass.

3. A bearing consisting of a race and tracks; of a large number of balls; and of two circular parts forming a collar that may have any outer desired shape, said circular parts having their various adjacent and contiguous parallel faces shaped into alternating male and female forms so that said circular parts will dovetail one another forming one mass.

4. A bearing consisting of a number of parts forming a race; of tracks; of a large number of balls; and of several circular parts forming a collar that may have any outer desired shape, said circular parts having their various adjacent and contiguous parallel faces shaped into alternating male and female forms so that said circular parts will dovetail one another forming one mass.

E. G. DU MAZUEL.